(12) United States Patent
Mann et al.

(10) Patent No.: US 11,983,180 B1
(45) Date of Patent: May 14, 2024

(54) INCREASING DATABASE SEARCH SPEED AND QUALITY BY CACHING USER-PROVIDED METADATA ALONGSIDE NON-USER-PROVIDED METADATA

(71) Applicant: QUORUM, Washington DC, MD (US)

(72) Inventors: Dylan Mann, San Francisco, CA (US); Brian Lucas, Annapolis, MD (US); Henrique Harman, New York, NY (US); Yuan Yue, Seattle, WA (US); Jonathan Marks, Boulder, CO (US)

(73) Assignee: QUORUM, Washington, DC (US)

( * ) Notice: Subject to any disclaimer, the term of this patent is extended or adjusted under 35 U.S.C. 154(b) by 0 days.

(21) Appl. No.: 17/988,645

(22) Filed: Nov. 16, 2022

(51) Int. Cl.
*G06F 16/24* (2019.01)
*G06F 16/22* (2019.01)
*G06F 16/242* (2019.01)
*G06F 16/2455* (2019.01)

(52) U.S. Cl.
CPC ........ *G06F 16/24552* (2019.01); *G06F 16/22* (2019.01); *G06F 16/2425* (2019.01)

(58) Field of Classification Search
CPC . G06F 16/24552; G06F 16/22; G06F 16/2425
See application file for complete search history.

(56) References Cited

U.S. PATENT DOCUMENTS

| | | | |
|---|---|---|---|
| 10,706,450 B1* | 7/2020 | Tavernier | G06F 16/9535 |
| 11,354,284 B2* | 6/2022 | Apte | G06F 16/284 |
| 11,429,629 B1* | 8/2022 | Pedapati | G06F 16/248 |
| 11,449,511 B1* | 9/2022 | Townsend | G06F 16/904 |
| 2003/0225761 A1* | 12/2003 | Wagener | G06F 16/9024 |
| 2017/0235848 A1* | 8/2017 | Van Dusen | G06Q 10/101 705/12 |
| 2023/0107652 A1* | 4/2023 | Veselova | G06F 16/24552 707/769 |

* cited by examiner

*Primary Examiner* — Merilyn P Nguyen
(74) *Attorney, Agent, or Firm* — Womble Bond Dickinson (US) LLP

(57) ABSTRACT

An apparatus may map one or more fields from a plurality of tables having a first table type to one or more mapped fields of a single table having a second table type and index the one or more mapped fields to correspond to a single index for the single table having the second table type. The apparatus may execute a first query using the single index corresponding to the one or more mapped fields to output a result for the first query. The apparatus may execute a second query for search activity that has occurred on the database since a last update to the single index and combine the result for the first query with the search activity that has occurred on the database since the last update to the single index to output a combined result based on the second query.

20 Claims, 7 Drawing Sheets

INCREASING DATABASE SEARCH SPEED AND QUALITY BY CACHING USER-PROVIDED METADATA ALONGSIDE NON-USER-PROVIDED METADATA

TECHNICAL FIELD

The present disclosure relates generally to database searching, and more particularly, to caching of user-provided metadata in databases.

BACKGROUND

In database searching techniques, full-text search (FTS) procedures may include searching a single computer-stored document or a collection of computer-stored documents based on a full-text of the documents stored in the database. For example, an FTS engine may examine all of the words in every stored document of the database as the FTS engine attempts to match search criteria that may have been indicated by a user. FTS search systems tend to use indexes to return accurate results quickly when the search relates to the standardized metadata of those documents. However, many applications support queries that are user-specific; namely, where a user filters documents based both on fields that every user can access (for example, the text or title of the document) and on fields that the user themselves has specified on the document (for example, whether they "like" that document or have flagged it for further review). Because indexing large collections of documents is computationally expensive and user-specified metadata typically changes in real-time, it is difficult to quickly search both standard and user-provided metadata on documents at the same time without additional, computationally intensive post-index filtering actions or without returning out-of-date results. Accordingly, there is a need in the art for techniques that improve a database searching speed when both standard and user-provided metadata are being queried without compromising the speed or accuracy of the search results.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method includes mapping one or more fields from a plurality of tables having a first table type to one or more mapped fields of a single table having a second table type, the plurality of tables included in different data sets of the database, the single table included in a same data set of the database; indexing the one or more mapped fields to correspond to a single index for the single table having the second table type; and executing a first query using the single index corresponding to the one or more mapped fields of the single table having the second table type to output a result for the first query.

In another aspect of the disclosure, a method, a computer-readable medium, and an apparatus are provided. The method includes executing a first query on the database using a single index that corresponds to a mapping of one or more fields from a plurality of tables having a first table type to one or more mapped fields of a single table having a second table type, the plurality of tables included in different data sets of the database, the single table included in a same data set of the database; executing a second query for search activity that has occurred on the database since a last update to the single index, the search activity corresponding to one or more search types; and outputting a combined result based on the first query and the second query, the combined result corresponding to information stored in the database and the search activity that has occurred on the database since the last update to the single index.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
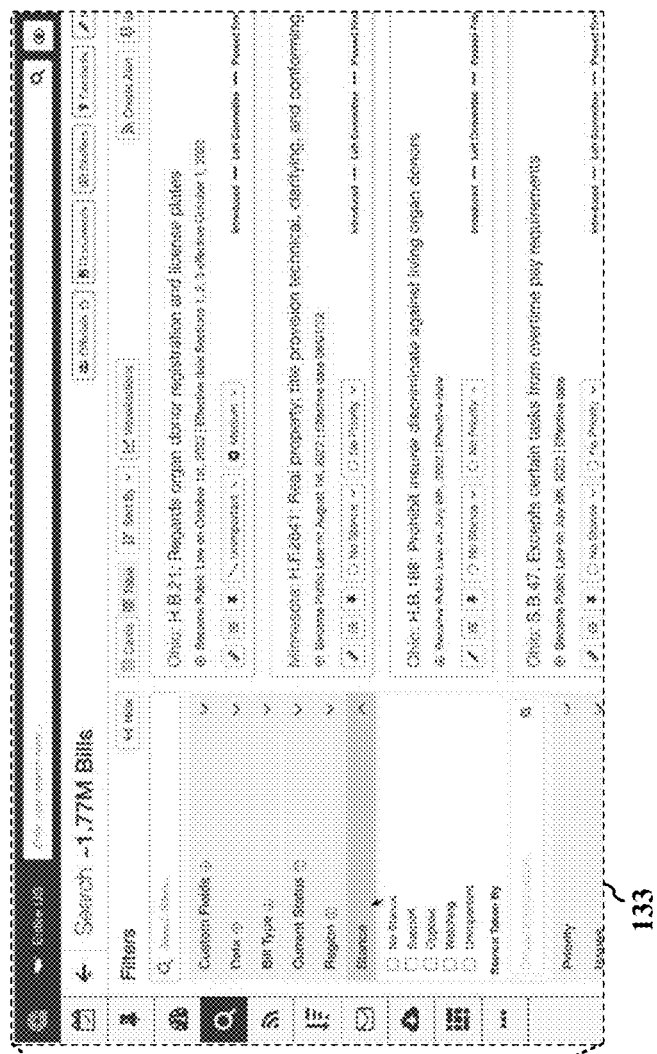
FIG. 1 is a diagram illustrating an example content generation system.
Figure 1:
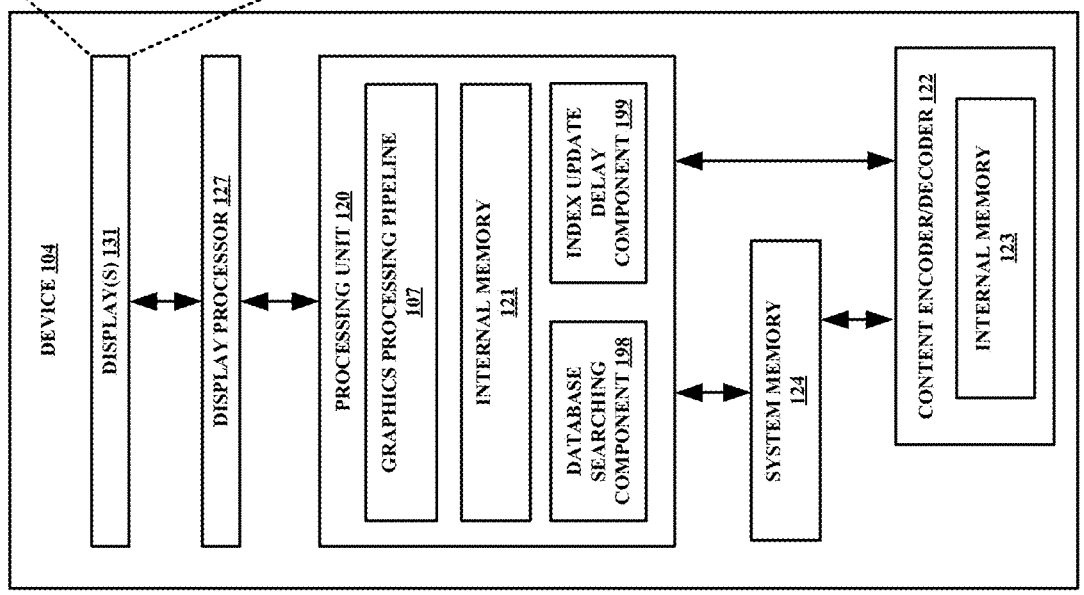

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects are presented with reference to various apparatus and methods. These apparatus and methods are described in the following detailed description and illustrated in the accompanying drawings by various blocks, components, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip, baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

FIG. 1 is a block diagram that illustrates an example content generation system 100. The content generation system 100 includes a device 104 that has one or more components or circuits for performing various functions described herein. The device 104 may include one or more displays 131, a display processor 127, a processing unit 120, a system memory 124, a content encoder/decoder 122, etc. Display(s) 131 may also be referred to herein as one or more displays 131. In some examples, graphics processing results/graphical content associated with an output of a search engine may be displayed through a user interface (UI) 133 on the display(s) 131. In other examples, the graphical processing results/graphical content may be transferred to another device for display, which may be referred to as split-rendering.

The processing unit 120 may include a graphics processing pipeline 107 and an internal memory 121. The processing unit 120 may be configured to perform graphics processing using the graphics processing pipeline 107. The processing unit 120 may also generate the graphical content displayed through the UI 133. The processing unit 120 further includes a database searching component 198 and an index update delay component 199, as will be discussed in further detail below, for performing various aspects and functionality described herein.

The display processor 127 may be configured to perform one or more display processing techniques on one or more frames/graphical content generated by the processing unit 120 before the frames/graphical content is displayed through the UI 133 on the one or more displays 131. While the example content generation system 100 illustrates a display processor 127, it should be understood that the display processor 127 is one example of a processor that can perform the functions descried herein and that other types of processors, controllers, etc., may be used as substitute for the display processor 127. The one or more displays 131 may be configured to display or otherwise present graphical content processed/output by the display processor 127. In some examples, the one or more displays 131 may include a liquid crystal display (LCD), a plasma display, an organic light emitting diode (OLED) display, a projection display device, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 includes the internal memory 121. The content encoder/decoder 122 may also include an internal memory 123. The processing unit 120 and the content encoder/decoder 122 may be communicatively coupled to the system memory 124 over a bus. In some examples, the processing unit 120 and the content encoder/decoder 122 may be communicatively coupled to the internal memories 121/123 over the bus or via a different connection. The content encoder/decoder 122 may be configured to receive graphical content from any source, such as the system memory 124 and/or the processing unit 120, and encode or decode the graphical content. In some examples, the graphical content may be in the form of encoded or decoded pixel data. The system memory 124 may be configured to store the graphical content in an encoded or decoded form.

The internal memories 121/123 and/or the system memory 124 may include one or more volatile or non-volatile memories or storage devices. In some examples, internal memories 121/123 or the system memory 124 may include RAM, static random access memory (SRAM), dynamic random access memory (DRAM), erasable programmable ROM (EPROM), EEPROM, flash memory, a magnetic data media, optical storage media, or any other type of memory. The internal memories 121/123 or the system memory 124 may be a non-transitory storage medium according to some examples. The term "non-transitory" may indicate that the storage medium is not embodied in a carrier wave or a propagated signal. However, the term "non-transitory" should not be interpreted to mean that the internal memories 121/123 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), or any other processing unit that may be configured to perform graphics processing. The content encoder/decoder 122 may be any processor configured to perform content encoding and content decoding. In some examples, the processing unit 120 and/or the content encoder/decoder 122 may be integrated into a motherboard of the device 104. The processing unit 120 may be present on a graphics card that is installed in a port of the motherboard of the device 104, or may be otherwise incorporated within a peripheral device configured to interoperate with the device 104. The processing unit 120 and/or the content encoder/decoder 122 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combination thereof. If the techniques are implemented partially in software, the processing unit 120 and/or the content encoder/decoder 122 may store instructions for the software in a suitable, non-transitory computer-readable storage medium (e.g., memory) and may execute the instructions in hardware using one or more processors to perform the techniques of this disclosure. Any of the foregoing, including hardware, software, a combination of hardware and software, etc., may be considered to be one or more processors.

In certain aspects, the processing unit 120 (e.g., GPU, CPU, etc.) may include a database searching component 198, which may include software, hardware, or a combination thereof configured to: map one or more fields from a plurality of tables having a first table type to one or more mapped fields of a single table having a second table type, the plurality of tables included in different data sets of the database, the single table included in a same data set of the database; index the one or more mapped fields to correspond to a single index for the single table having the second table type; and execute a first query using the single index corresponding to the one or more mapped fields of the single table having the second table type to output a result for the first query.

In further aspects, the processing unit 120 (e.g., GPU, CPU, etc.) may include an index update delay component 199, which may include software, hardware, or a combination thereof configured to: execute a first query on the database using a single index that corresponds to a mapping of one or more fields from a plurality of tables having a first table type to one or more mapped fields of a single table having a second table type, the plurality of tables included in different data sets of the database, the single table included in a same data set of the database; execute a second query for search activity that has occurred on the database since a last update to the single index, the search activity corresponding to one or more search types; and output a combined result based on the first query and the second query, the combined result corresponding to information stored in the database and the search activity that has occurred on the database since the last update to the single index. Although the following description may be focused on database searching, the concepts described herein may be applicable to other similar processing techniques.

Figure 2:
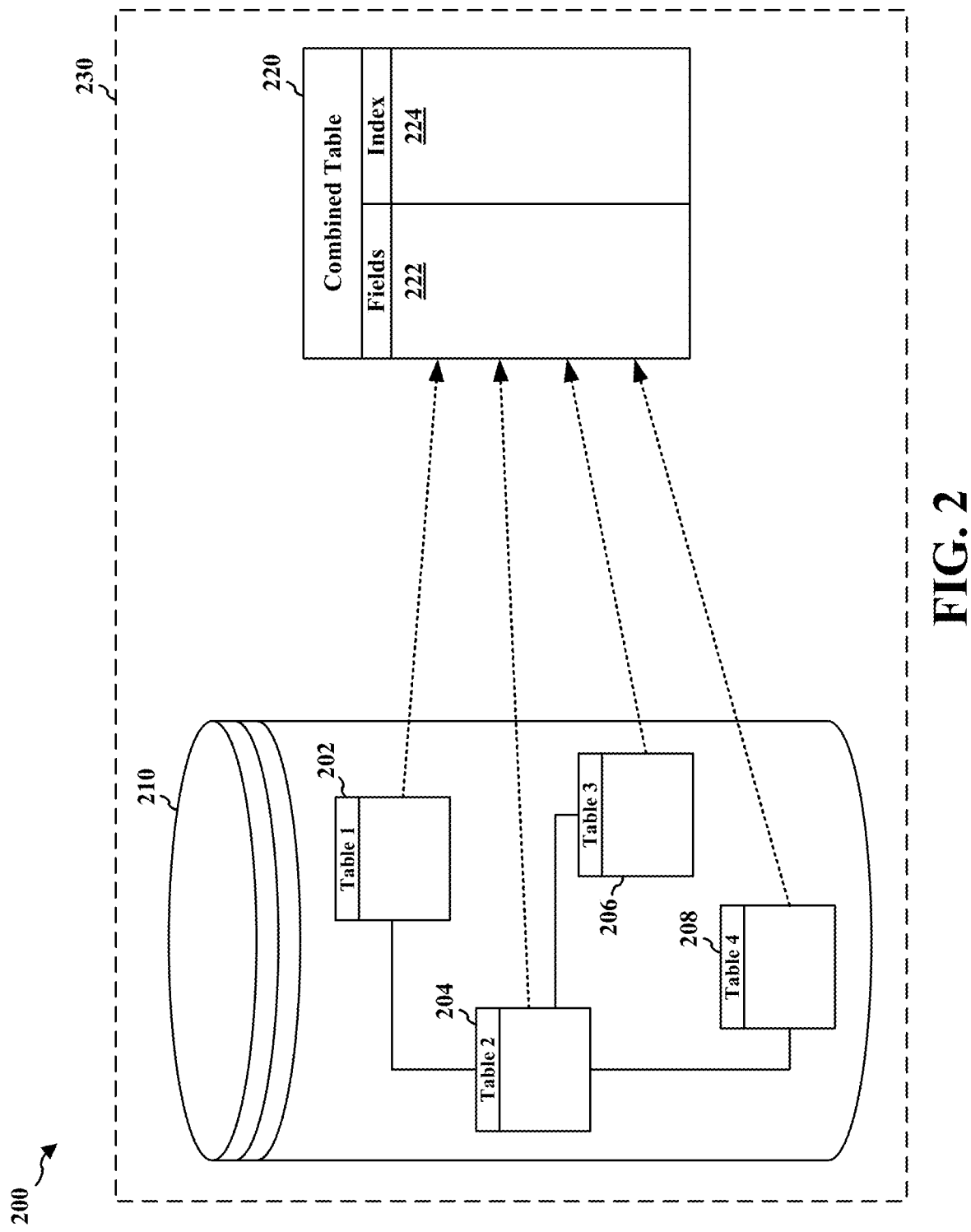
FIG. 2 is a diagram illustrating a mapping from a plurality of tables associated with different data sets to a combined table.

FIG. 2 is a diagram 200 illustrating a mapping from a plurality of tables 202-208 associated with different data sets to a combined table 220. Input/output (I/O) load reductions based on full-text search (FTS) indices may increase a search speed of documents/information stored in a database 210 and improve a user experience. For example, removing FTS indices may reduce the I/O load associated with FTS procedures by 20-30%, which may increase the document search speed by a factor of 10 and increase the update/insert (i.e., "upsert") speed by a factor of 100. More accurate document search results may also be provided based on eliminating phrase searches associated with FTS processes.

In examples, rather than joining different data sets together, such as table 1 202, table 2 204, table 3 206, and table 4 208, through various logical connections in a relational database 210 and searching the different data sets during a same procedure, information from separate tables 202-208 within the database 210 may be combined and stored in a same data set as a combined table 220 to perform a search across both common data, such as general document information applicable to multiple users (e.g., title, document number, etc.), as well as user-specific data, such as a "stance" that the user has (e.g., likes or dislikes) for particular documents within the database 210.

A search of the combined/stored data associated with a single/combined table 220 may be executed more quickly than a search of data stored in the relational database 210 that might include the various logical connections between the multiple data sets/tables 202-208. The data mapped to the combined table 220 from the different data sets of the relational database 210 may be searched based on a single index 224. Indexing the information in the data set may include changing a search destination to indicate a different destination than FTS indices. The index 224 may be sharded into different logical segments for different types of data. For example, documents in the data set may be of different types, including "documents" as an alias for feature-based document indices, a separate shard for each of news articles, social media posts, legislation, or other types of documents, etc. However, sharding techniques may be less applicable in cases where new types of documents are being generated and added to the data set. Therefore, indexing procedures may be performed based on a retention period or performed in a manner that combines newly generated documents with other document types. The index 224 could be updated daily, monthly, etc., depending on a size of the data set, where each updated index 224 might include 3-5 shards. Each shard might be further limited in size to 10-50 gigabytes (GB).

FTS searches may be performed on data stored in the relational database 210. For example, if a user performs a search for a legislative bill in the relational database 210, metadata might be generated that indicates whether the user views the legislative bill favorably (e.g., likes or dislikes the bill), whether the legislative bill is associated with a particular issue of interest to the user, whether the user views the legislative bill as important, etc. The metadata might also be indicative of a public official that sponsored the legislative bill and/or a political party from which the legislative bill originated. Different fields of information may be stored in the different tables 202-208 that are logically connected for searching the data based on a relational model. The information in the different tables 202-208 may be filtered based on an input to generate an output indicative of a particular field, but processing speeds may be decreased as a result of having to index across the various logical connections to the different data sets/tables 202-208.

Unlike relational database searching, which may be based on searching multiple tables 202-208 that include the different data sets to generate the output, a single index 224 with increased robustness may be used to search a same data set/table 220. The indexing structure for the search may allow the data set to be searched more efficiently given that a non-relational model does not rely on logical interconnections between many different tables/data sets. Database fields for each document/table 202-208 stored in the database 210 may be mapped to search fields 222 for performing the search. Example database fields might include "created" or "updated" fields and a corresponding example database field type might include a "date" field type. In another example, the database field might be a "position in record" and the corresponding database field type might be an "integer" field, which may be mapped to an "int" search type. Many other database fields/types and search fields/ types are contemplated by this disclosure. Single index searches may also offer backward compatibility in terms of searching, filtering, functionality, etc.

A database 230 that includes the combined table 220 for the search may be updated based on a cron or any other mechanism for processing updates to datasets, such as reading items from a queue. The cron may be executed at periodic intervals to check for and store new/updated documents in the database 230 for indexing. In some examples, other crons may be executed at the same or different periodic intervals to delete documents from the database 230. For example, a cron may be executed daily or monthly to remove documents from the database 230 that have become stale. When the database 230 includes a large number of documents, indexing all the documents during a same procedure might decrease a speed of the search. Hence, a plurality of crons may be executed to store/update various documents by type, region, etc.

Denormalization techniques may be implemented to increase performance based on copying information from multiple tables 202-208 into the combined table 220 used for the search. Denormalization refers to the process of adding redundant copies of data or grouped data to a data set to improve a read performance of the database 230, but which may come at a cost to the write performance of the database 230. In an example, a legislative bill might include information that is common for each user that downloads the legislative bill (e.g., the title, the bill number, etc.). Thus, storing N copies of the legislative bill for each user in the database 230 may result in decreased performance, particularly when certain information is redundant/common to different user searches. Accordingly, indexing techniques may be based on aggregating data from multiple users searches and denormalizing the data to improve the search speed. Aggregation and denormalization may be performed for each data type of a plurality of data types included in the different tables 202-208 and/or may be performed for arbitrary data types. The data may be stored in the combined table 220 that may be searched by one or more users. When the data is searched, the data may be reduced to reveal only information that a searching user is authorized to view (e.g., based on filtering).

Figure 3:
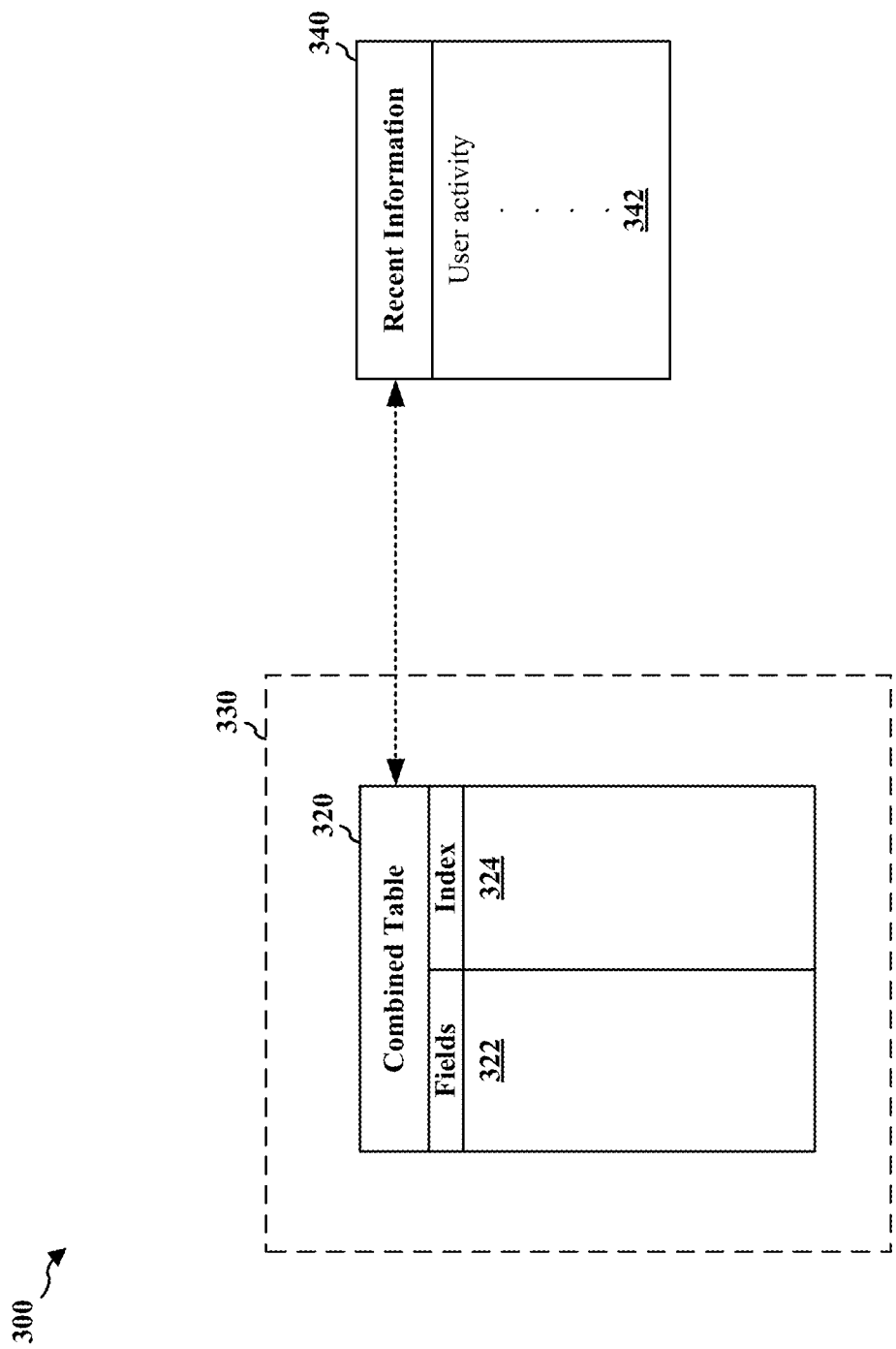
FIG. 3 is a diagram that illustrates recent information for a user being generated after a most recent indexing update to a combined table.

FIG. 3 is a diagram 300 that illustrates recent information 340 for a user being generated after a most recent indexing update to a combined table 320. Based on a mapping from a relational database to the fields 322 of the combined table 320, user-specific information/inputs may be analyzed for changes that have occurred since the index 324 was last updated. If user information has changed, the data set may be re-indexed/resaved based on the recent changes at a next update time for the index 324. Logical connections between different tables of the relational database may also be updated periodically prior to performing mappings of the data to the combined table 330 for indexing. The index 324 may be used for one or more search queries of one or more users. Some data structures may or may not include both relational and non-relational databases. For example, the database 330 illustrated in FIG. 3 might be a standalone database that includes the combined table 320, whereas the database 230 illustrated in FIG. 2 might include both a non-relational data set (e.g., the combined table 220) and a relational data set (e.g., the different tables 202-208).

Results from the denormalized database 330 may be combined with the recent information 340 based on recent user activity 342 to increase an accuracy of the output for a search query. An output generated based on both the denormalized data and the recent information 340 may be compared to a relational database output to determine whether the outputs are the same. If so, the relational database output/model may be used. Otherwise, the combined information output is used. A join that occurs in the relational database may increase the speed of the search. In other databases, where a FTS would have been slow using a relational database and/or filtering, the combined table 320 may be used to increase the speed, given that there may not be a difference in the output results.

As the index 324 may be updated on a periodic basis, a delay period may occur where new information has become available but the index 324 has not yet been updated based on the new information. Thus, if a user executes a search (e.g., indicating an assignment and/or a stance for a search), the generated results might be more accurate if the output also accounts for the recent information 340/user activity 342 that has not yet been considered for indexing in the combined table 320. Since denormalization might not be a continuous procedure, or even a frequently procedure, due to an increased amount of time associated with updating large indexes (that may include millions of links), a tradeoff may be observed between updating the index 324 on a more frequent basis and being able to search/retrieve information more quickly.

Single index searching may be extended to data associated with recent user activity 342 (e.g., caching user-provided metadata alongside non-user-provided metadata). For example, a user may select a first legislative bill of interest to the user. A few second later the user may execute a search for other bills of interest to the user, which might include a match to a particular search term. Updating a common/global index 324, which may be used by multiple users, to reflect recent user activity 342 may be a relatively slow procedure that could impact a speed of the search results for a query. Additionally, cached information may be outdated, which may lead to less accurate search results.

Accordingly, data associated with recent inputs from a user might not available to contribute to search results until after the index 324 is refreshed/updated at a periodic/predefined interval. Thus, when a user performs a search, a separate query may be executed to search for recent information 340/inputs (e.g., that may be less than 15 minutes old) corresponding to a search type of the search being performed. For instance, if the search type corresponds to a "stance" on a legislative bill, such as the user views the bill favorably, the separate query may be executed to search for other stances that the user has recently input (e.g., within the last 15 minutes). In an example, a user might indicate that legislative bill X is of interest to the user. Further, a relational database might indicate which stance(s) have occurred over a recent timeframe (e.g., last 15 minutes), so that the stances may be considered along with the combined table 320 to generate an output. That is, the separate query executed based on a user search that occurs 30 seconds after the index 324 is updated may allow the output results to be based on the stance(s) associated with the recent user activity 342.

In another example, a search may be executed for bills that reference X along with an additional query parameter. Some outputs may provide outdated results (e.g., by a few minutes), if the outputs do not account for recent inputs from the user. The bills that reference X might not change. However, the additional query parameter might be outdated (e.g., by a few minutes) as a result of delays in updating the index 324. When a search is performed by the user, the bills that reference X may be queried along with the additional query parameter. To reduce a possibility of having the results be outdated, a relational database is also queried to determine the recent information 340/inputs from the user related to the additional query parameter. As text searching may not be part of the separate query associated with the user activity 342, the search may be performed relatively quickly.

For execution of a search for the bills that reference X along with the additional query parameter, documents determined to be associated with the recent information 340/inputs may be used to generate the results. In examples, such documents may be further searched based on text conditions. Some results associated with the recent information 340 may also be excluded, if the user activity 342 indicates that the results do not satisfy the additional query parameter. The search for the recent information 340 may be time bounded based on a periodic interval for updating the index 324. For example, if the index is updated every M minutes, user activity searches of the relational database may be limited to the previous M minutes, or an even shorter time to the last index update.

Figure 4:
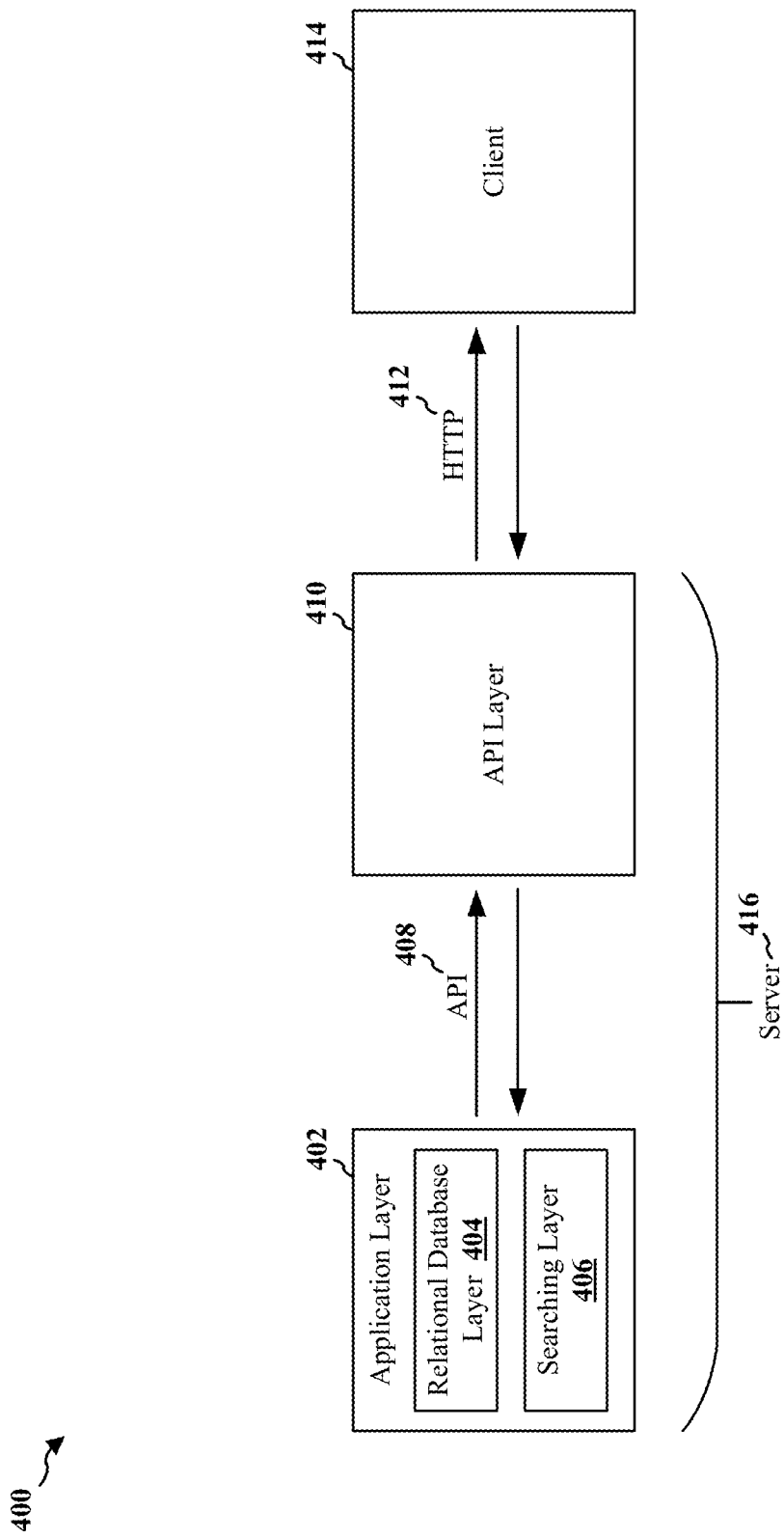
FIG. 4 is a diagram that illustrates layers and interfaces for a server and a client.

FIG. 4 is a diagram 400 that illustrates layers and interfaces for a server 416 and a client 414. In order to increase security over information that is viewable to specific users at the client 414, a filter may be applied on top of output information from an application layer 402 before the information is received by an application programming interface (API) layer 410 over an API 408. The filter may be user-specific so that a particular user is only able to view the information that the user is authorized to view. The API layer 410 may not have access to the information in a data store (e.g., search documents), and may communicate with the application layer 402 to receive the information. Within the application layer 402, a relational database layer 404 may be in communication with a searching layer 406.

Some user information may be indexed, rather than stored at the searching layer 406. A user may transmit a request from the client 414 to the server 416, such as by hypertext transfer protocol (HTTP) 412, which may indicate a query for the searching layer 406. The query may trigger filtering operations, such as a filter for FTS or query parameters, for displaying information fields to the users via the client 414. The information may be serialized and sent to a front end for the user to view at the client 414.

User identity information might not be the subject of a user query, but the query and the identity of the user may be determined for applying the filter. However, the identity of the user may remain secure based on applying the filter to the search/query, as the information indicated to the application layer 402 over the API 408 is not indicative of the user identity. That is, the information filtered out for the query is not used by the application layer 402 to return information to other users that are also initiating queries on the same data set, which provides a level of information security for the user of the client 414. In particular, user-specific/private information is filtered out, which provides a first layer of security at the client level based on queries not requesting user information and a second layer of security at the application layer 402 based on the filtering.

Searches at the searching layer 406 may be based on predefined search options (e.g., drop-down menus, radio buttons, etc.) and/or based on free text searches (e.g., search bars). Some searches may be executed based on objective criteria, such as titles, labels, etc., while other searches may be executed based on subjective criteria, such as a stance that the user has on a particular document. Hence, some search results may be returned using a snippet engine that indicates highlighted snippets from one or more documents. The snippet engine may determine to highlight snippets based on one or more query parameters used for the search at the searching layer 406.

Fast types of queries may experience a 4 times increase in search speed based on the searching techniques described herein and slower types of queries may experience a 20-40 times increase in search speed based on the searching techniques described herein. Join results may also experience a corresponding increase in speed based on denormalization procedures. Rather than having multiple different tables that are logically connected, denormalization allows the information to be included in a same/combined table, which provides the increase in search speed. A tradeoff between normalization and denormalization is that denormalization provides for faster querying, but may experience a reduction in accuracy, whereas normalization may provide for slower querying, but can produce results with improved accuracy. Thus, the searching techniques described herein may be implemented to balance the tradeoff between search speed and accuracy.

Figure 5:
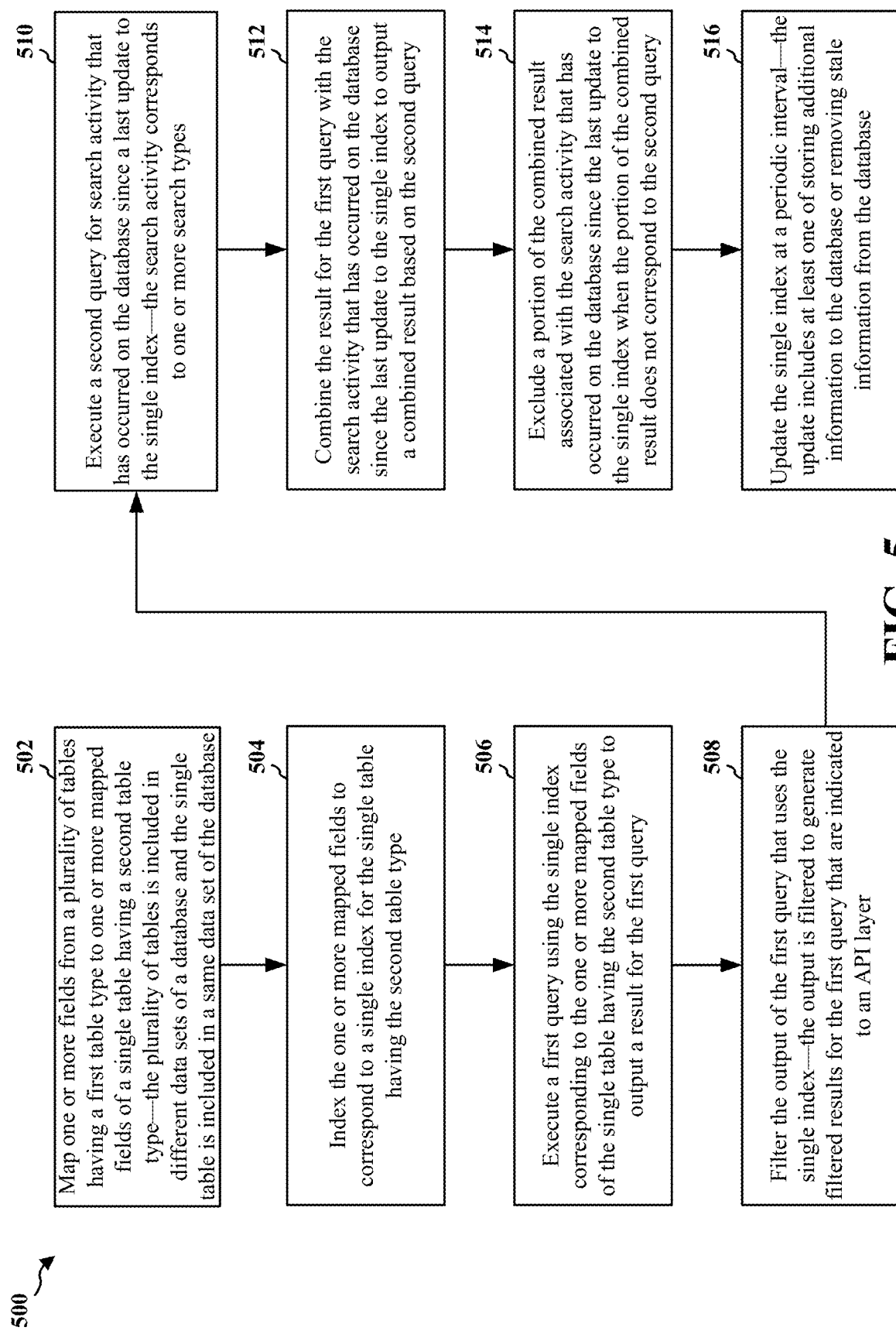
FIG. 5 is a flowchart of a method of searching a database.

FIG. 5 is a flowchart 500 of a method of searching a database. The method may be performed by processing logic that may comprise hardware (e.g., circuitry, dedicated logic, programmable logic, a processor, a processing device, a CPU, a system-on-chip, etc.), software (e.g., instructions running/executing on a processing device), firmware (e.g., microcode), or a combination thereof. In some embodiments, at least a portion of the method may be performed based on aspects of FIGS. 1-4.

With reference to FIG. 5, the method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

The method begins at block 502, where processing logic maps one or more fields from a plurality of tables having a first table type to one or more mapped fields of a single table having a second table type—the plurality of tables is included in different data sets of a database and the single table is included in a same data set of the database. For example, the mapping may be based on a denormalization procedure that associates redundant data from the plurality of tables with the single table.

At block 504, the processing logic indexes the one or more mapped fields to correspond to a single index for the single table having the second table type. For example, the indexing may include adjusting a search destination for the first query from a first type of search associated with the plurality of tables to a second type of search associated with the single table. The indexing may also include sharding the single index into a plurality of logical segments associated with the one or more mapped fields of the single table having the second table type.

At block 506, the processing logic executes a first query using the single index corresponding to the one or more mapped fields of the single table having the second table type to output a result for the first query.

At block 508, the processing logic filters the output of the first query that uses the single index—the output is filtered to generate filtered results for the first query that are indicated to an API layer.

At block 510, the processing logic executes a second query for search activity that has occurred on the database since a last update to the single index—the search activity corresponds to one or more search types. For example, the search activity associated with the second query may be time bounded between a time of the last update to the single index and a current time.

At block 512, the processing logic combines the result for the first query with the search activity that has occurred on the database since the last update to the single index to output a combined result based on the second query.

At block 514, the processing logic excludes a portion of the combined result associated with the search activity that has occurred on the database since the last update to the single index when the portion of the combined result does not correspond to the second query.

At block 516, the processing logic updates the single index at a periodic interval—the update includes at least one of storing additional information to the database or removing stale information from the database. For example, the update may be based on at least one cron associated with at least one document type.

Figure 6:
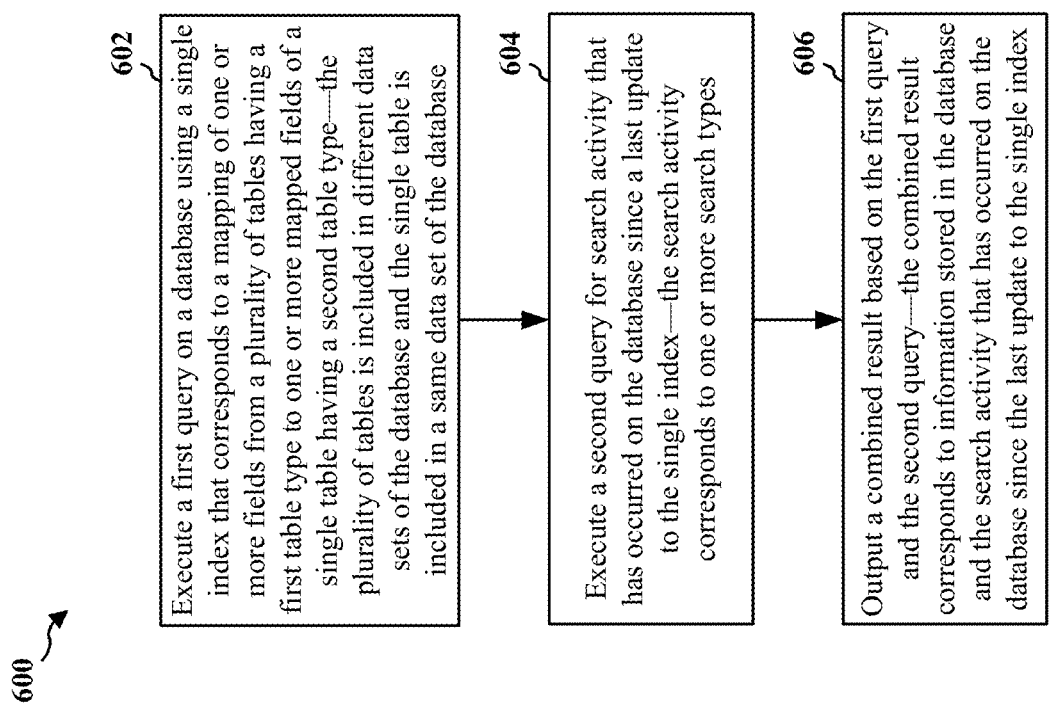
FIG. 6 is a flowchart of a method of searching a database.

FIG. 6 is a flowchart 600 of a method of searching a database. The method may be performed by processing logic that may comprise hardware (e.g., circuitry, dedicated logic, programmable logic, a processor, a processing device, a CPU, a system-on-chip, etc.), software (e.g., instructions running/executing on a processing device), firmware (e.g., microcode), or a combination thereof. In some embodiments, at least a portion of the method may be performed based on aspects of FIGS. 1-4.

With reference to FIG. 6, the method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

The method begins at block 602, where processing logic execute a first query on a database using a single index that corresponds to a mapping of one or more fields from a plurality of tables having a first table type to one or more mapped fields of a single table having a second table type—the plurality of tables is included in different data sets of the database and the single table is included in a same data set of the database.

At block 604, the processing logic executes a second query for search activity that has occurred on the database since a last update to the single index—the search activity corresponds to one or more search types.

At block 606, the processing logic outputs a combined result based on the first query and the second query—the combined result corresponds to information stored in the database and the search activity that has occurred on the database since the last update to the single index.

Figure 7:
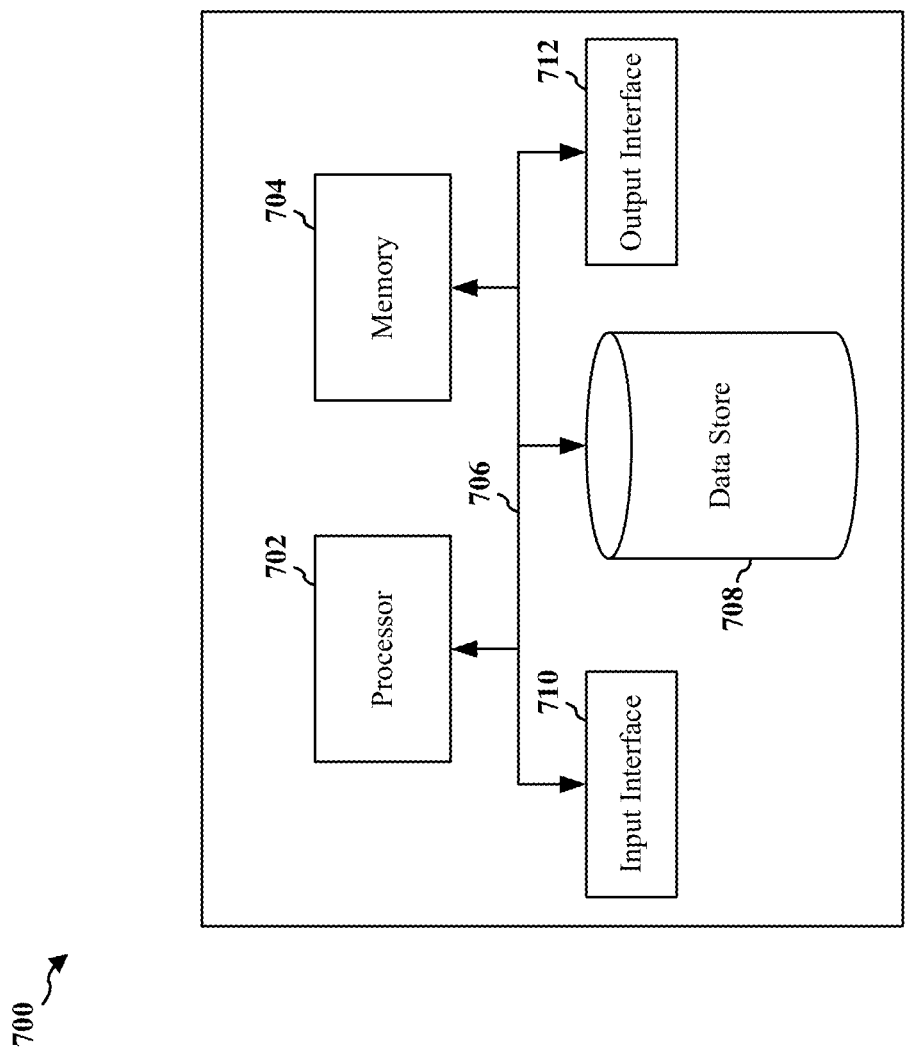
FIG. 7 is a high-level illustration of an exemplary computing device that can be used in accordance with the systems and methodologies disclosed herein.

FIG. 7 is a high-level illustration of an exemplary computing device 700 that can be used in accordance with the systems and methodologies disclosed herein. For instance, the computing device 700 may be or include the device 104. The computing device 700 includes at least one processor 702 that executes instructions that are stored in a memory 704. The instructions may be, for instance, instructions for implementing functionality described as being carried out by one or more modules or instructions for implementing one or more of the methods described above. The processor 702 may access the memory 704 by way of a system bus 706.

The computing device 700 additionally includes a data store 708 that is accessible by the processor 702 by way of the system bus 706. The data store 708 may include executable instructions and the like. The computing device 700 also includes an input interface 710 that allows external devices to communicate with the computing device 700. For instance, the input interface 710 may be used to receive instructions from an external computing device, from a user, etc. The computing device 700 also includes an output interface 712 that interfaces the computing device 700 with one or more external devices.

Additionally, while illustrated as a single system, it is to be understood that the computing device 700 may be a distributed system. Thus, for instance, several devices may be in communication by way of a network connection and may collectively perform tasks described as being performed by the computing device 700.

The description herein is provided to enable a person skilled in the art to practice the various aspects described herein. Various modifications to these aspects will be readily apparent to those skilled in the art, and the generic principles defined herein may be applied to other aspects. Thus, the claims are not limited to the aspects described herein, but are to be interpreted in view of the full scope of the present disclosure consistent with the language of the claims.

Reference to an element in the singular does not mean "one and only one" unless specifically stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. Unless specifically stated otherwise, the term "some" refers to one or more. Combinations such as "at least one of A, B, or C" or "one or more of A, B, or C" include any combination of A, B, and/or C, such as A and B, A and C, B and C, or A and B and C, and may include multiples of A, multiples of B, and/or multiples of C, or may include A only, B only, or C only. Sets should be interpreted as a set of elements where the elements number one or more.

Unless otherwise specifically indicated, ordinal terms such as "first" and "second" do not necessarily imply an order in time, sequence, numerical value, etc., but are used to distinguish between different instances of a term or phrase that follows each ordinal term.

Structural and functional equivalents to elements of the various aspects described throughout this disclosure that are known or later come to be known to those of ordinary skill in the art are expressly incorporated herein by reference and are encompassed by the claims. The words "module," "mechanism," "element," "device," and the like may not be a substitute for the word "means." As such, no claim element is to be construed as a means plus function unless the element is expressly recited using the phrase "means for." As used herein, the phrase "based on" shall not be construed as a reference to a closed set of information, one or more conditions, one or more factors, or the like. In other words, the phrase "based on A", where "A" may be information, a condition, a factor, or the like, shall be construed as "based at least on A" unless specifically recited differently.

The following aspects are illustrative only and may be combined with other aspects or teachings described herein, without limitation.

Example 1 is a method of searching a database, including: mapping one or more fields from a plurality of tables having a first table type to one or more mapped fields of a single table having a second table type, the plurality of tables included in different data sets of the database, the single table included in a same data set of the database; indexing the one or more mapped fields to correspond to a single index for the single table having the second table type; and executing a first query using the single index corresponding to the one or more mapped fields of the single table having the second table type to output a result for the first query.

Example 2 may be combined with example 1 and further includes executing a second query for search activity that has occurred on the database since a last update to the single index, the search activity corresponding to one or more search types; and combining the result for the first query with the search activity that has occurred on the database since the last update to the single index to output a combined result based on the second query.

Example 3 may be combined with any of examples 1-2 and includes that the search activity associated with the second query is time bounded between a time of the last update to the single index and a current time.

Example 4 may be combined with any of examples 1-3 and further includes excluding a portion of the combined result associated with the search activity that has occurred on the database since the last update to the single index when the portion of the combined result does not correspond to the second query.

Example 5 may be combined with any of examples 1-4 and includes that indexing the one or more mapped fields to correspond to the single index, further includes: adjusting a search destination for the first query from a first type of search associated with the plurality of tables to a second type of search associated with the single table.

Example 6 may be combined with any of examples 1-5 and further includes updating the single index at a periodic interval, the update including at least one of storing additional information to the database or removing stale information from the database.

Example 7 may be combined with any of examples 1-6 and includes that the update including the at least one of the storing additional information to the database or the removing stale information from the database is based on at least one cron associated with at least one document type.

Example 8 may be combined with any of examples 1-7 and includes that indexing the one or more mapped fields to correspond to the single index, further includes: sharding the single index into a plurality of logical segments associated with the one or more mapped fields of the single table having the second table type.

Example 9 may be combined with any of examples 1-8 and includes that the one or more fields from the plurality of tables having the first table type correspond to one or more database fields from a plurality of database tables having a database table type, and includes that the one or more mapped fields of the single table having the second table type correspond to a combined search field of a combined table having a combined table type.

Example 10 may be combined with any of examples 1-9 and includes that the one or more database fields are associated with at least one database field type, and includes that the combined search field is associated with a combined search field type.

Example 11 may be combined with any of examples 1-10 and includes that mapping the one or more fields from the plurality of tables having the first table type to the one or more mapped fields of the single table having the second table type is based on a denormalization procedure that associates redundant data from the plurality of tables with the single table.

Example 12 may be combined with any of examples 1-11 and includes that the denormalization procedure is performed for at least a subset of data types included in the plurality of tables.

Example 13 may be combined with any of examples 1-12 and further includes filtering the output of the first query that uses the single index, and includes that the output is filtered to generate filtered results for the first query that are indicated to an API layer.

Example 14 may be combined with any of examples 1-13 and includes that the database is a standalone database including the single table having the second table type or a combined database including the plurality of tables having the first table type and the single table having the second table type.

Example 15 is a method of searching a database, including: executing a first query on the database using a single index that corresponds to a mapping of one or more fields from a plurality of tables having a first table type to one or more mapped fields of a single table having a second table type, the plurality of tables included in different data sets of the database, the single table included in a same data set of the database; executing a second query for search activity that has occurred on the database since a last update to the single index, the search activity corresponding to one or more search types; and outputting a combined result based on the first query and the second query, the combined result corresponding to information stored in the database and the search activity that has occurred on the database since the last update to the single index.

Example 16 is an apparatus for wireless communication for implementing a method as in any of examples 1-15.

Example 17 is an apparatus for wireless communication including means for implementing a method as in any of examples 1-15.

Example 18 is a non-transitory computer-readable medium storing computer executable code, the code when executed by at least one processor causes the at least one processor to implement a method as in any of examples 1-15.

What is claimed is:
1. A method of searching a database, comprising:
   mapping one or more fields from a plurality of tables having a first table type to one or more mapped fields of a single table having a second table type, the plurality of tables included in different data sets of the database, the single table included in a same data set of the database;
   indexing the one or more mapped fields to correspond to a single index for the single table having the second table type;
   executing a first query using the single index corresponding to the one or more mapped fields of the single table having the second table type to output a result for the first query, and
   executing a second query for search activity that has occurred on the database since a last update to the single index to output a combined result based on the first query and the second query, the search activity corresponding to one or more search types.
2. The method of claim 1, further comprising:
   combining the result for the first query with the search activity that has occurred on the database since the last update to the single index.

3. The method of claim 2, wherein the search activity associated with the second query is time bounded between a time of the last update to the single index and a current time.

4. The method of claim 1, further comprising excluding a portion of the combined result associated with the search activity that has occurred on the database since the last update to the single index when the portion of the combined result does not correspond to the second query.

5. The method of claim 1, wherein indexing the one or more mapped fields to correspond to the single index, further comprises:
adjusting a search destination for the first query from a first type of search associated with the plurality of tables to a second type of search associated with the single table.

6. The method of claim 1, further comprising updating the single index at a periodic interval, the update including at least one of storing additional information to the database or removing stale information from the database.

7. The method of claim 6, wherein the update including the at least one of the storing additional information to the database or the removing stale information from the database is based on at least one cron associated with at least one document type.

8. The method of claim 1, wherein indexing the one or more mapped fields to correspond to the single index, further comprises:
sharding the single index into a plurality of logical segments associated with the one or more mapped fields of the single table having the second table type.

9. The method of claim 1, wherein the one or more fields from the plurality of tables having the first table type correspond to one or more database fields from a plurality of database tables having a database table type, and wherein the one or more mapped fields of the single table having the second table type correspond to a combined search field of a combined table having a combined table type.

10. The method of claim 9, wherein the one or more database fields are associated with at least one database field type, and wherein the combined search field is associated with a combined search field type.

11. The method of claim 1, wherein mapping the one or more fields from the plurality of tables having the first table type to the one or more mapped fields of the single table having the second table type is based on a denormalization procedure that associates redundant data from the plurality of tables with the single table.

12. The method of claim 11, wherein the denormalization procedure is performed for at least a subset of data types included in the plurality of tables.

13. The method of claim 1, further comprising filtering the output of the first query that uses the single index, wherein the output is filtered to generate filtered results for the first query that are indicated to an application programming interface (API) layer.

14. The method of claim 1, wherein the database is a standalone database including the single table having the second table type or a combined database including the plurality of tables having the first table type and the single table having the second table type.

15. A method of searching a database, comprising:
executing a first query on the database using a single index that corresponds to a mapping of one or more fields from a plurality of tables having a first table type to one or more mapped fields of a single table having a second table type, the plurality of tables included in different data sets of the database, the single table included in a same data set of the database;
executing a second query for search activity that has occurred on the database since a last update to the single index, the search activity corresponding to one or more search types; and
outputting a combined result based on the first query and the second query, the combined result corresponding to information stored in the database and the search activity that has occurred on the database since the last update to the single index.

16. An apparatus for searching a database, comprising:
a memory; and
at least one processor coupled to the memory and configured to:
map one or more fields from a plurality of tables having a first table type to one or more mapped fields of a single table having a second table type, the plurality of tables included in different data sets of the database, the single table included in a same data set of the database;
index the one or more mapped fields to correspond to a single index for the single table having the second table type;
execute a first query using the single index corresponding to the one or more mapped fields of the single table having the second table type to output a result for the first query; and
execute a second query for search activity that has occurred on the database since a last update to the single index to output a combined result based on the first query and the second query, the search activity corresponding to one or more search types.

17. The apparatus of claim 16, wherein the at least one processor is further configured to:
combine the result for the first query with the search activity that has occurred on the database since the last update to the single index.

18. The apparatus of claim 16, wherein the search activity associated with the second query is time bounded between a time of the last update to the single index and a current time.

19. The apparatus of claim 16, wherein the at least one processor is further configured to exclude a portion of the combined result associated with the search activity that has occurred on the database since the last update to the single index when the portion of the combined result does not correspond to the second query.

20. The apparatus of claim 16, wherein the at least one processor is further configured to update the single index at a periodic interval, the update including at least one of storing additional information to the database or removing stale information from the database.

* * * * *